United States Patent [19]
Forst

[11] Patent Number: 5,908,026
[45] Date of Patent: Jun. 1, 1999

[54] PORTABLE VERTICAL ROTARY GRILL

[76] Inventor: Gary L. Forst, W165 N10541 Wagon Trail, Germantown, Wis. 53022

[21] Appl. No.: 09/085,732

[22] Filed: May 27, 1998

[51] Int. Cl.$^6$ ........................................................ A47J 37/07
[52] U.S. Cl. ........................ 126/25 AA; 126/9 R; 126/30
[58] Field of Search ............................... 126/25 AA, 9 R, 126/93, 29, 30; 248/318, 324, 339; 99/449, 450

[56] References Cited

U.S. PATENT DOCUMENTS

| | | | |
|---|---|---|---|
| 4,117,630 | 10/1978 | Kalas | 248/318 |
| 4,732,138 | 3/1988 | Vos | 126/9 R |
| 5,025,715 | 6/1991 | Sir | 126/9 R |
| 5,297,534 | 3/1994 | Louden | 126/9 R |

*Primary Examiner*—Ira S. Lazarus
*Assistant Examiner*—Sara Raab
*Attorney, Agent, or Firm*—Donald J. Ersler

[57] ABSTRACT

A portable vertical rotary grill includes a support structure, a power source, a motor, and a grill. The support structure is preferably a tripod, but other support structures may also be used. The power source is preferably two D size dry cell batteries. A battery holder is preferably fastened to a top of the motor. The motor assembly is fastened to a top of the support structure with a chain. A thrust bearing is attached to an output shaft of the motor. The thrust bearing is supported by a thrust plate which is fastened to an outer housing of the motor. A chain collar is attached to the output shaft of the motor at an end thereof. A chain with a hook on an end thereof extends downward from the chain collar. The grill is preferably supported by three chains which are equally spaced around the circumference of the grill. The three chains are joined at their ends and placed on the hook.

16 Claims, 2 Drawing Sheets

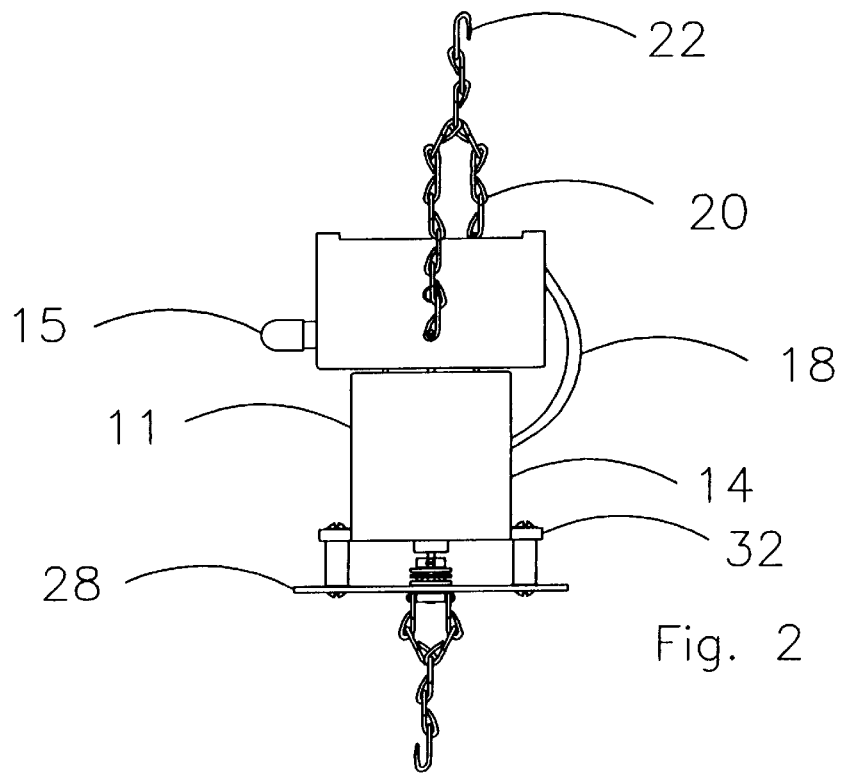
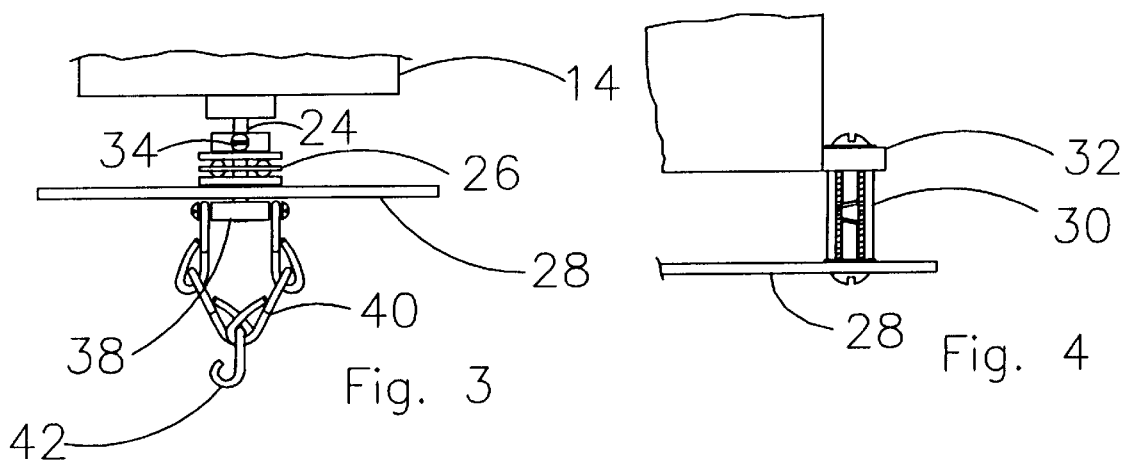

PORTABLE VERTICAL ROTARY GRILL

BACKGROUND OF THE INVENTION

1. Field of the Invention

The present invention relates generally to rotary grills and more specifically to a portable vertical rotary grill which allows food items to be evenly cooked over a campfire.

2. Discussion of the Prior Art

There are at least two patents directed at providing a vertical rotary grill. U.S. Pat. No. 4,732,138 to Vos discloses several embodiments of campfire cookers and at least one which may be rotated. U.S. Pat. No. 5,297,534 to Louden discloses a stationary vertical rotary grill. Neither of these designs disclose a portable vertical rotary grill which may be operated by two D size batteries.

Accordingly, there is a clearly felt need in the art for a portable vertical rotary grill which may be easily transported from one area to another, vertically rotates a grill surface over a ground fire, and may be driven by two D size batteries.

SUMMARY OF THE INVENTION

The primary objective of the present invention is to provide a portable vertical rotary grill which may be easily transported from one area to another, vertically rotates a grill surface over a ground fire, and may be driven by two D size batteries.

According to the present invention, a portable vertical rotary grill includes a support structure, a power source, a motor, and a grill. The support structure is preferably a tripod, but other support structures may also be used. The power source is preferably two D size dry cell batteries. A battery holder is preferably fastened to a top of the motor. The motor and battery holder are included in a motor assembly which is fastened to a top of the support structure with a chain. A thrust bearing is attached to an output shaft of the motor. The thrust bearing is supported by a thrust plate which is fastened to an outer housing of the motor. A chain collar is attached to the output shaft of the motor at an end thereof. A chain with a hook on an end thereof extends downward from the chain collar. The grill is preferably supported by three chains which are equally spaced around the circumference of the grill. The three chains are joined at their ends and placed on the hook.

Accordingly, it is an object of the present invention to provide a portable vertical rotary grill which may easily transported from one site to another.

It is a further object of the present invention to provide a portable vertical rotary grill which rotates a grill surface over a ground fire.

It is yet a further object of the present invention to provide a portable vertical rotary grill which has a grill that may be easily adjusted along a vertical axis.

Finally, it is another object of the present invention to provide a portable vertical rotary grill which may be operated with two D size batteries.

These and additional objects, advantages, features and benefits of the present invention will become apparent from the following specification.

BRIEF DESCRIPTION OF THE DRAWINGS

FIG. 2 is a front view of a motor assembly in accordance with the present invention;

FIG. 3 is an enlarged front view of the thrust bearing in accordance with the present invention; and FIG. 4 is an enlarged front view of the motor attached to a thrust plate in accordance with the present invention;

DETAILED DESCRIPTION OF THE PREFERRED EMBODIMENTS

Figure 1:
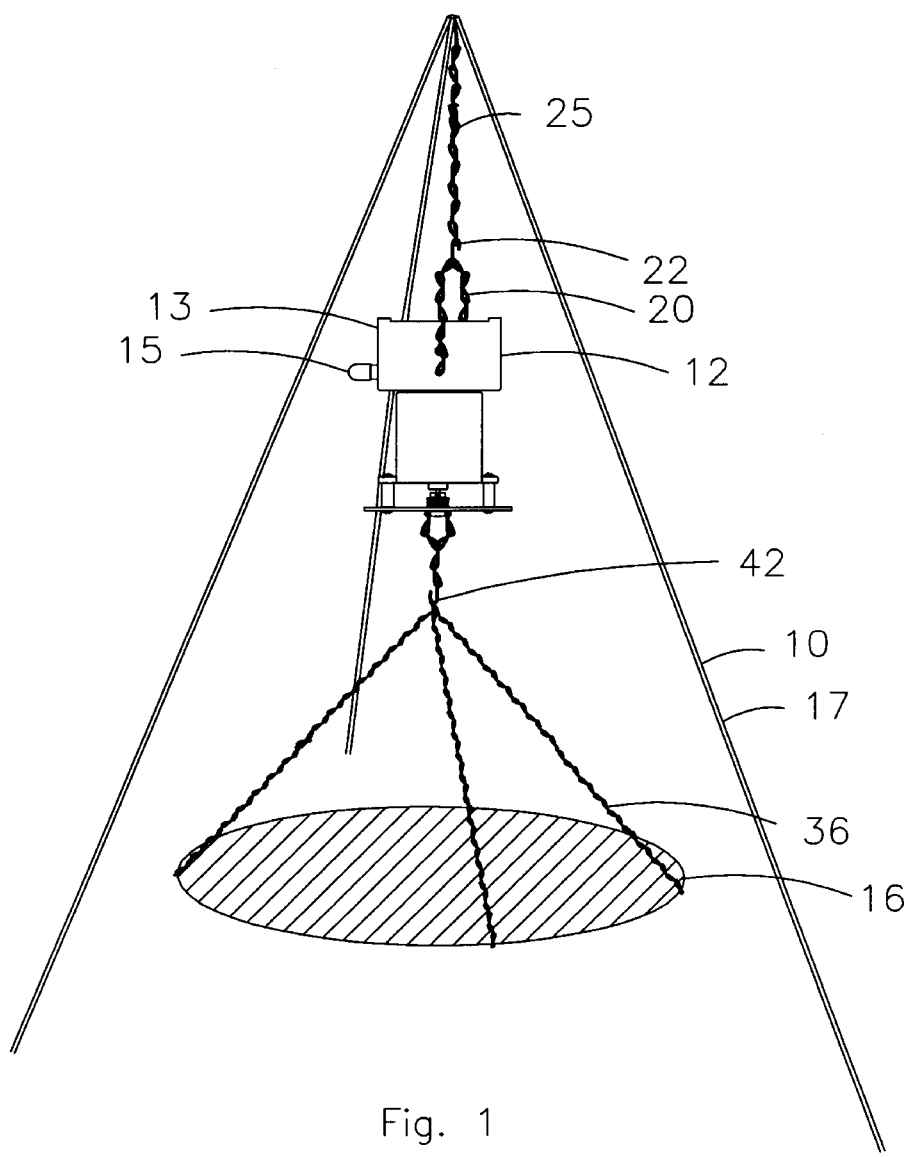
FIG. 1 is a perspective view of the portable vertical rotary grill in accordance with the present invention.

With reference now to the drawings, and particularly to FIG. 1, there is shown a perspective view of a portable vertical rotary grill 1. A portable vertical rotary grill 1 includes a support structure 10, a power source 12, a motor 14, and a grill 16. The power source 12 is preferably two D size dry cell batteries, but could also be a 3 volt DC power adapter. A battery holder 13 is preferably fastened to a first end of the motor 14. The two D size batteries are retained in the battery holder 13. The motor 14 preferably operates off DC voltage to facilitate the use of battery power. The motor 14 could be driven by AC voltage and the power source 12 would also provide AC power. The portable vertical rotary grill 1 should not be limited to portable applications only, but the support structure 10 could be stationary. The battery holder 13 includes an on-off switch 15. With reference to FIG. 2, the on-off switch 15 provides current to the motor 14 through a power wire 18 when the on-off switch 15 is in the "on" position. The on-off switch 15 closes the circuit between motor 15 and the batteries when in the "on" position. A second wire acts as the ground connection between the batteries and motor 14. Two 1.5 volt batteries are placed in series to provide the 3 volt DC power.

A motor assembly 11 includes the battery holder 13, motor 14, thrust plate 28, and thrust plate bearings 26. Preferably, a motor chain 20 is fastened to both sides of the battery holder 13. A motor hook 22 is fastened to the motor chain 20. A method of mounting the motor assembly 11 to a support structure should not be limited to a chain and hook, but could include wire, plastic straps, a molded plastic hook, or any suitable mounting means. A tripod chain 25 extends downward from a top of the tripod 17. The tripod 17 contains a structure for raising and lowering the tripod chain 25 or the like. Tripods which have chains which may be raised and lowered are well known in the art. The support structure 10 could also be of the stationary variety as shown in the Louden '534 patent in FIG. 1. The vertical adjustability of the tripod chain 25 facilitates the raising and lowering of the grill 16 relative to a ground fire or campfire.

FIGS. 3 and 4 show enlarged front views of the second end of the motor 14. A pair of flanges 32 extend outward from a motor housing at a second end thereof. A thrust bearing 26 is slid over the output shaft 24 of the motor 14. A thrust plate 28 is attached to the flanges 32 with a pair of threaded spacers 30. A first screw is inserted through a hole in the thrust plate 28 and threaded into one end of the threaded spacer 30. A second screw is inserted through a hole in the flange and threaded into the other end of the threaded spacer 30. The invention should not be limited to using only threaded spacers 30 and screws, but should include any device which allows the thrust plate 28 to be attached to the flanges 32 while maintaining an appropriate space therebetween. The thrust bearing 26 is fastened to the output shaft 24 such that the internal bearings in the motor 14 are not subjected to axially loading from the weight of the grill 16. The thrust bearing 26 and thrust plate 28 absorb the weight of the grill 16, thus extending the life of the motor 14. The thrust bearing 26 is preferably fastened to the output shaft 24 by firmly tightening the set screw 34.

A chain collar 38 is fastened to the end of the output shaft 24 and a chain 40 is attached to the chain collar 38. A hook 42 is attached to the middle of the chain 40. The method of retaining the grill chains 36 should not be limited to a chain and hook, but could include wire, or any suitable retaining means. The grill 16 is preferably supported by three grill chains 36 which are equally spaced around the circumference of the grill 16. The first end of each grill chain 36 is attached to the circumference of the grill. The grill chains 36 could also be replaced with wire, a metal rod or any suitable grill support means which can withstand several hundred degrees of heat. The second end of each grill chain 36 is joined to each other. The juncture of the three grill chains 36 are hung on the hook 42.

The portable vertical rotary grill 1 is set-up in the following manner. The tripod 17 is stretched out and placed on the ground. The motor hook 22 is inserted into the tripod chain 25. The second ends of the grill chains 36 are placed on the hook 42. The height of the grill 16 is adjusted by manipulating the length of the tripod chain 25 such that the grill 16 would be the correct height over the ground fire. The portable vertical rotary grill 1 is then placed over the ground fire. The height of the grill 16 in relation to the ground fire may be perfectly adjusted after it is set over the ground fire. The rotation of the grill 16 is implemented by placing the switch 15 in the "on" position. The motor 14 will preferably rotate the grill 16 at a speed of one revolution per minute to ensure even cooking of food items placed on the grill 16. The motor 14 contains internal gear reduction to slow down the rotational speed of the output shaft 24.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A motor assembly for vertically rotating a grill comprising:

a motor having a motor housing and an output shaft extending outward from one end;

a power source supplying said motor with electrical power;

a thrust plate;

a thrust bearing being fastened to said output shaft, said thrust bearing being forced against said thrust plate by the weight of a grill;

an attachment means extending from said motor housing for retaining said thrust plate, said attachment means providing a space between said one end of said motor housing and said thrust plate, said thrust bearing being supported by said thrust plate; and a means of mounting said motor assembly to a support structure.

2. The motor assembly for vertically rotating a grill of claim 1, further comprising:

a means for retaining a grill being fastened to an end of said output shaft.

3. The motor assembly for vertically rotating a grill of claim 2, wherein:

said means for retaining a grill including a chain collar which is fastened to said end of said output shaft, a chain being fastened to said chain collar, a hook being fastened to said chain.

4. The motor assembly for vertically rotating a grill of claim 1, wherein:

said power source being two D sized batteries.

5. The motor assembly for vertically rotating a grill of claim 1, further comprising:

said motor having the speed thereof reduced with gear reduction.

6. A motor assembly for vertically rotating a grill comprising:

a motor having a motor housing, said motor housing having at least two flanges extending outward therefrom, said motor having an output shaft extending outward from one end;

a battery holder being retained to said motor housing;

a thrust plate being attached to said flanges of said motor housing;

a thrust bearing being fastened to said output shaft;

at least two spacers being attached to said thrust plate and said flanges, wherein said thrust bearing being forced against said thrust plate by the weight of a grill; and a means of mounting said motor assembly to a support structure.

7. The motor assembly for vertically rotating a grill of claim 6, further comprising:

a means for retaining a grill being fastened to an end of said output shaft.

8. The motor assembly for vertically rotating a grill of claim 7, wherein:

said means for retaining a grill including a chain collar which is fastened to said end of said output shaft, a chain being fastened to said chain collar, a hook being fastened to said chain.

9. The motor assembly for vertically rotating a grill of claim 6, wherein:

said power source being two D sized batteries.

10. The motor assembly for vertically rotating a grill of claim 6, further comprising:

said motor having the speed thereof reduced with gear reduction.

11. A portable vertical rotary grill comprising:

a support structure;

a motor having a motor housing and an output shaft extending outward from one end, said motor being fastened to said support structure;

a power source which supplies said motor which electrical power;

a thrust plate being attached to said motor housing;

a thrust bearing being fastened to said output shaft; and a grill being held by a retaining means, said retaining means being attached to an end of said output shaft, said retaining means including a chain collar which is fastened to said end of said output shaft, a chain being fastened to said chain collar, a hook being fastened to a grill support means.

12. The portable vertical rotary grill of claim 11, wherein:

said motor housing having at least two flanges extending outward therefrom.

13. The portable vertical rotary grill of claim 11, further comprising:

at least two spacers being attached to said thrust plate and said flanges, wherein said thrust bearing being forced against said thrust plate by the weight of a grill.

14. The portable vertical rotary grill of claim 11, wherein:

said support structure allowing said motor assembly to be easily raised and lowered.

15. The portable vertical rotary grill of claim 11, wherein:

said support structure being a tripod.

16. The portable vertical rotary grill of claim 11, wherein:

said power source being two D sized batteries retained in a battery holder.

* * * * *